United States Patent [19]

Dodson

[11] Patent Number: 4,987,306
[45] Date of Patent: Jan. 22, 1991

[54] COLOR MONITORING IN LIQUID SCINTILLATION SYSTEMS

[75] Inventor: Charles L. Dodson, Orange, Calif.
[73] Assignee: Beckman Instruments, Fullerton, Calif.
[21] Appl. No.: 386,816
[22] Filed: Jul. 27, 1989
[51] Int. Cl.$^5$ .......................... G01T 1/208; G01T 1/00
[52] U.S. Cl. .................................. 250/362; 250/328; 250/364
[58] Field of Search ........................ 250/362, 364, 328

[56] References Cited

U.S. PATENT DOCUMENTS

| | | |
|---|---|---|
| 3,725,657 | 7/1971 | Laney .................... 250/362 |
| 4,075,480 | 2/1978 | Horrocks ................ 250/328 |
| 4,085,325 | 4/1978 | Atallah et al. ........... 250/328 |
| 4,292,520 | 9/1981 | Jordan .................... 250/328 |
| 4,315,151 | 2/1982 | Horrocks ................ 250/362 |
| 4,555,629 | 11/1985 | Everett ................... 250/362 |
| 4,633,088 | 1/1986 | Jones et al. ............. 250/369 |
| 4,700,072 | 10/1987 | Oikari et al. ............ 250/328 |
| 4,894,545 | 1/1990 | Dodson .................. 250/264 |

FOREIGN PATENT DOCUMENTS 220146 3/1985 German Democratic Rep. .................. 250/364

OTHER PUBLICATIONS

Bush, E. T., "A Double Ratio Technique as an Aid To Selection of Sample Preparation Procedures in Liquid Scintillation Counting," *Int. J. Appl Rad. Isot.* 19(1968) pp. 447–452.

Ross, H. H. "Color Quench Correction in Liquid Scintillator Systems Using an Isolated Internal Standard," *J. Analytical Chemistry* 37, 4 (Apr. 1965) pp. 621–623.

Iwakura, T. et al., "Carbon-14 and Hydrogen-3 Measurement by Means of a Liquid Scintillation spectrometer: Color Quenching," *Symposium on Radioisotope Sample Measurement Techniques in Medicine and Biology* (1965) pp. 447–455.

Ross, et al., "Quantitative Interpretation of Color Quenching in Liquid Scintillator Systems," *J. Analytical Chemistry* 35,7 (Jun. 1963) pp. 794–797.

Ediss, et al., "A Broad Spectrum Colour Quencher for Liquid Scintillation Counting," *Int. J. Appl. Rad. Isot.* vol. 33(1982) pp. 296–297.

Ross, H. H. "Theoretical and Experimental Aspects of Quenching Variables From Biomedical Samples in Liquid Scintillator Systems," *Symposium on Radioisotope Sample Measurement Techniques in Medicine and Biology*, Vienna, IAEA (1965) pp. 447–455.

*Primary Examiner*—Constantine Hannaher
*Attorney, Agent, or Firm*—Charles Berman

[57] ABSTRACT

Monitoring and measuring colored samples by the techniques of liquid scintillation counting employs the relationship of absorbance and counting efficiency. A determination of whether color quench correction is required is made. Should a color monitor detect a color intensity which requires color correction, then efficiency correction is performed here. Both the color monitor and the color correction of efficiency are incorporated into a liquid scintillation counter which performs color monitoring, measurement and correction automatically.

29 Claims, 5 Drawing Sheets

COMPTON SPECTRUM FOR DETERMINING H#

COLOR MONITORING IN LIQUID SCINTILLATION SYSTEMS

RELATED APPLICATION

This application is related to an application Ser. No. 07/386,303, entitled "Detecting Multiple Phases in Liquid Scintillation Samples" by the present Applicant and filed simultaneously with this application. The contents of the related application are incorporated by reference herein.

BACKGROUND

This invention relates to liquid scintillation counting. In particular the invention is concerned with a system for monitoring and measuring the color of samples in a liquid scintillation counter. The system is directed to determining whether the color in a liquid scintillation sample is sufficiently intense such that direct activity, namely disintegrations per minute (DPM) of the sample can be determined from a conventional chemical quench curve.

It is known that fewer photons leave the vial of a quenched liquid scintillation sample relative to photons leaving an unquenched sample. Three primary quenching processes are known: chemical, color, and absorption. Each of these processes interferes with one of the energy exchange processes required for the production of light and its detection by a photomultiplier tube.

The effect of quenching can be described in relation to the following energy transfer processes which take place in a liquid scintillation cocktail.

| | |
|---|---|
| 1. $\bar{B} + \bar{S} \rightarrow S + B$ | electronic excitation of the solvent |
| 2. $\bar{S} + \bar{F} \rightarrow S + F$ | electronic excitation of the Fluor |
| 3. $\bar{F} \rightarrow F + hV$ | photon emission by the Fluor |
| 4. $hV + PMT \rightarrow Ep$ | photoelectric electron emission by the PMT |

A beta particle, B, with kinetic energy interacts with a solvent molecule, S, in the cocktail causing its electronic excitation, $\bar{S}$; step 1. The excess electronic energy of the solvent can be passed to a fluor molecule, F, causing its electronic excitation, $\bar{F}$; step 2. The excited fluor molecule can emit a photon, hV; step 3, and return to the electronic ground state. This photon, after leaving the vial, can interact with the cathode of a photomultiplier tube and produce a photoelectric electron. This signal is amplified and represents the "observation of a radionuclide decay event."

Quench refers to any process which interferes with the energy exchange reactions represented in the above steps. Absorption quench refers to processes which interfere with step 1. In other words, a beta particle is prevented by absorption from reacting with a solvent molecule. Chemical quench refers to interference either with excitation of $\bar{F}$, step 2, or via internal energy mode decay which prevents production of hV in step 3. Some molecule other than the solvent is excited by the beta particle, thereby preventing solvent excitation. Color quench refers to any chemical which absorbs hV produced by the fluor so that light does not reach the PMT in step 4.

The wavelength of the emitted light depends upon the specific fluor. This generally lies between 380–430 nm; however, the emission bands are broad and may extend beyond these wavelengths. Any substance absorbing energy in the stated wavelength range decreases the number of photons leaving the sample vial. Where the DPM in the sample is required a quench curve is used. This requires the counting efficiency, E, of the sample as defined by:

$$E = \frac{100}{1} \frac{CPM}{DPM}$$

where the counts per minute (CPM) is observed for a sample having DPM disintegrations per minute. To obtain DPM for an unknown, CPM is measured directly by a liquid scintillation counter while E is obtained from a quench curve previously prepared. A quench curve relates nuclide counting efficiency, E, to some quench monitor, for instance the H# in Horrocks (U.S. Pat. No. 4,075,480). A quench curve is developed from a set of quenched standards, each containing the same number of DPM's of the same radionuclide, but containing a different quantity of a chemical quench agent.

With the availability of the quench curve, the DPM of an unknown sample is obtained by measurement of the H# and CPM of the sample. The counting efficiency is obtained from the H# and quench curve.

This gives accurate values for DPM provided that only chemical quench is present. Should color quench be present, then a chemical quench curve does not always recover DPM correctly, since there is a difference between chemical and color quench curves in terms of H#. As the level of quench increases, the difference between the chemical and color quench curves increases, thus leading to increased percentage error in DPM.

Different quench curves are thus required for chemically quenched standards and for a set of color quenched standards. For measuring an unknown sample it would be necessary to know beforehand which quench curve to use. Furthermore, if an unknown contained both chemical and color quenching agents or a color agent which absorbed at a wavelength different from the agent used for the quench curve standard, then the available curves would not provide the correct answer. Accordingly, a variety of quench curves is needed to answer correctly for a variety of chromophores at a variety of quench levels.

Some limited solutions for color quench correction have been suggested. The suggested color quench curve corrections have been for specific systems with one exception. Specific systems are those with no variations between the standard and the unknown regarding the cocktail, chromophore or level of quench present.

Also, quench monitors with limitations have been reported; none however, has been placed on an automatic liquid scintillation counter.

One prior art approach depends upon correlations between counting efficiency and spectroscopic parameters such as absorbance or wavelength of the absorber. A second approach depends upon the development of and analysis of four different quench curves which are functions of two different quench monitors for the two types of quench, color and chemical. The third approach involves some variation on the concept of lesser pulse height analysis. A fourth approach includes isolated internal standards and spectral analysis Additionally other investigators have sought to solve the problem in effect by either establishing color quench curves and measuring unknowns from them or by decolorizing the system through the use of chemical oxidizing agents.

There has been limited success with the spectroscopy approach in trying to correlate the primary wavelength of absorption of the chromophore with the counting efficiency of the sample. A multicomponent analysis approach to the use of the Beer-Lambert law correlating absorbance and the counting efficiency of the sample has also been attempted. Difficulties with these methods include the numerous measurements and the awkwardness of automation.

Using the four quench curve approach, two quench curves are developed for pure chemical quench and two for pure color quench. For an unknown having pure chemical quench, the two quench curves for chemical quench would give the same values for the counting efficiency while the two color curves would not. Should the unknown be pure color quenched, then the two color quench curves would give the same efficiency while the chemical quench curves would not. This scheme is not useful if both chemical and color quench are present. An advantage of this method however is that it provides a built-in quench monitor.

With the lesser pulse height analysis technique, the pulses from two photomultiplier tubes are examined separately. This allows mathematical analysis to combine advantageously the results of summation counting from both tubes with single tube results either in or out of coincidence.

In general, if light is generated at a point, in a sample, then one path, to one photomultiplier tube is shorter than a second path, to a second photomultiplier tube. This difference is important, since, if color is present, absorbance, As, is path length dependent, L. Absorbance is also concentration, C, and chromophore dependent, A, according to the Beer-Lambert law:

$$As = ALC$$

Assuming that the same number of photons leave along both paths, then fewer photons will arrive at one tube than the other tube in accordance with the Beer-Lambert law because the one path is longer than the other path. The pulse arriving at the one tube will be of lesser intensity. In general, for each decay event in the presence of color, the intensities of the two pulses arriving at the respective tubes will be different. Laney (U.S. Pat. No. 3,725,657) and Jordan (U.S. Pat. No. 4,292,520) disclose using the lesser intense pulse to monitor counting efficiency.

Here, the separated color and chemical quench curves which occur if summed coincidence is used, become one curve if the lesser pulse is used. In other words, the color effect is not monitored by the lesser pulse, since it is lost. This is both advantageous and disadvantageous. One advantageous aspect is that only one quench curve per radionuclide is required to obtain counting efficiencies for both color and chemically quenched samples. The technique however does not solve the color correction problem in a general sense, since the chemical and color quench curves split apart again at higher quench levels even if lesser pulse height analysis is used. The lesser pulse height technique is also not capable of providing a color monitor since the technique is insensitive to color.

With an isolated internal standard technique a "sealed internal standard" in a pyrex tube with a small internal diameter is prepared. This standard contains a sample of the radionuclide to be measured in an unknown. Preparation of sealed internal standards for each radionuclide of interest is required. The mechanical placement of the internal standard into a sample vial, its removal and cleaning prior to use in the next sample is not conducive to an automated operation.

No combination of color monitor and color correction has been developed together and incorporated onto an automated liquid scintillation counter in any of the methods discussed above.

It is an object of the present invention to provide a monitor to determine whether a given chemical quench curve can be applied accurately to a given sample.

SUMMARY OF THE INVENTION

According to the invention there is provided a color monitor, i.e., means to detect automatically the need for color correction in samples presented to a liquid scintillation counter.

Further, once the need for such a correction is established, additional means is provided to make the required correction for color. Additionally, the invention incorporates both the color monitor and color corrector into a liquid scintillation counter which carries out both monitoring and correction automatically on presented samples.

The user of such a counter need prepare only a single chemical quench curve for each radionuclide required for such measurements. This is the same requirement for recovery of DPM's for any unknown sample containing only a chemical quench.

In liquid scintillation counting of a sample, the counts of the sample according to the presence of a chemical quench is determined.

According to the invention, the existence of a color component in the sample is determined by a predetermined variation from the counts of the sample from the chemical quench.

Further, according to the invention, in a liquid scintillation counter there is means for determining the absorbance characteristic of a sample. There are also means for establishing the absorbance characteristic due to chemical quench at predetermined quench levels, and means for determining, at a predetermined quench level the deviation of an absorbance characteristic due to color quench.

The invention is further described with reference to the accompanying drawings:

DRAWINGS

Figure 2:
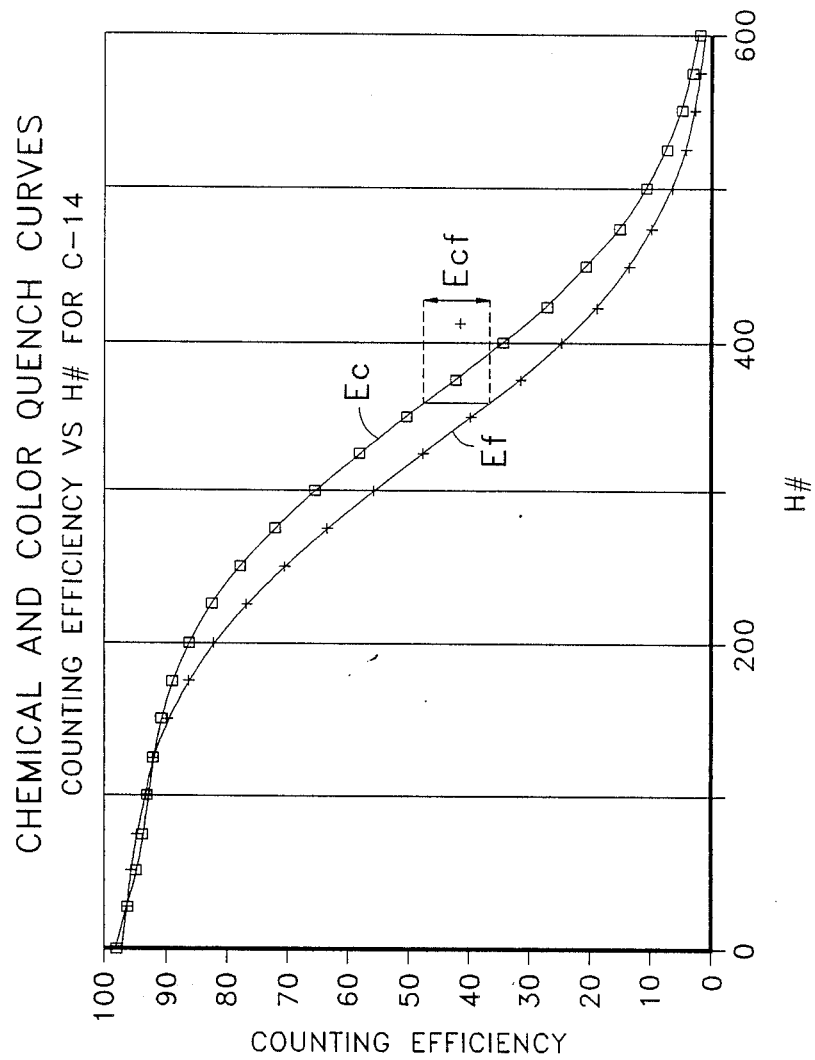
FIG. 2 are quench curves illustrating the difference between chemical and color quench for carbon-14 using the H# as the quench monitor against counting efficiency.
Figure 3:
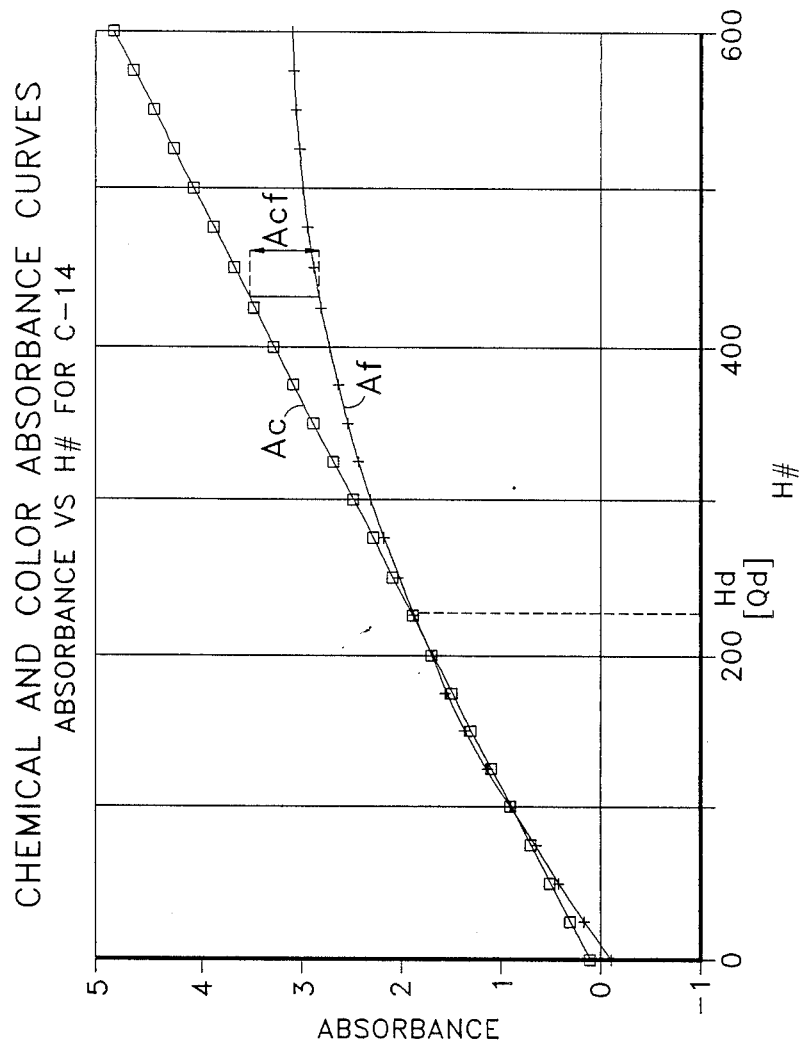
FIG. 3 are absorbance curves comparing chemical and color absorption plots versus H# for carbon-14.
Figure 4:
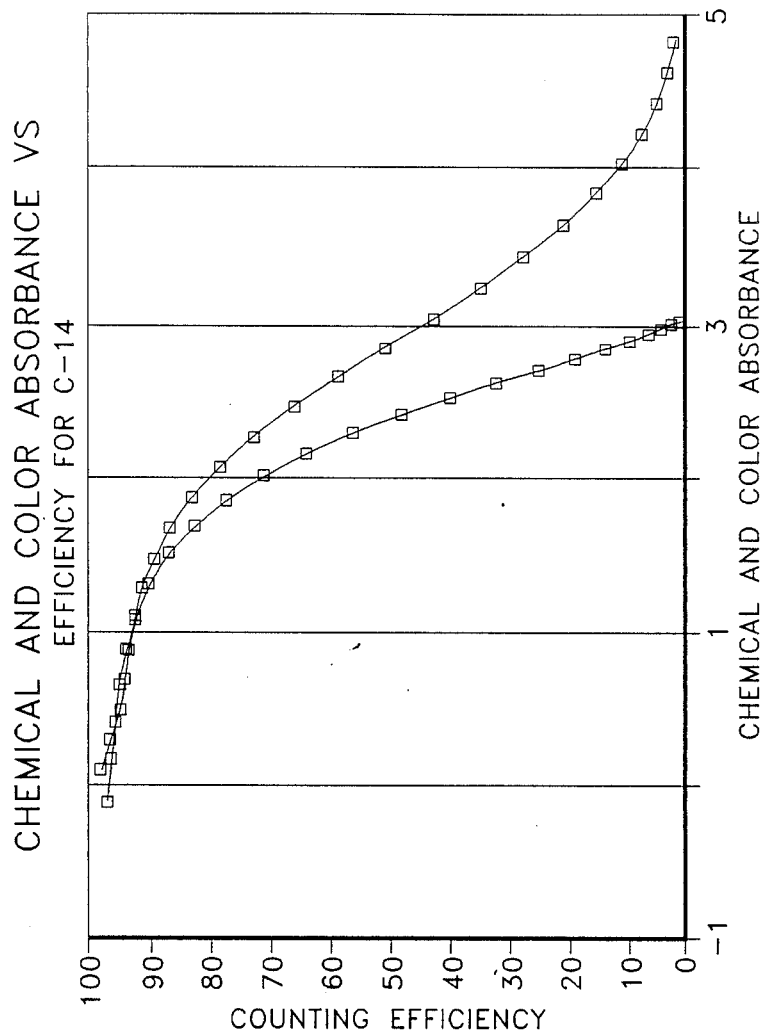

FIG. 4 compares the relationship of absorption against counting efficiency for the carbon-14 data of FIGS. 2 and 3.

Figure 5:
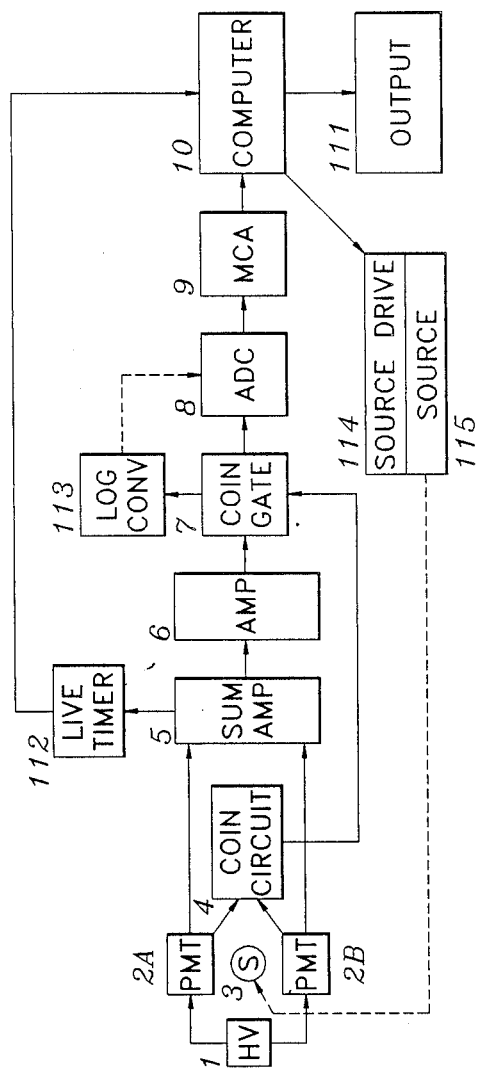

FIG. 5 is a block diagram of a liquid scintillation counter which contains means to provide Compton spectra of presented samples, means to monitor the presence of color, and means to provide for color correction as needed to obtain the correct values of DPM.

DESCRIPTION

The description is divided into three parts: color monitoring, color correction and the operation of the liquid scintillation (LS) counter which incorporates the color monitor and color correction.

Figure 1:
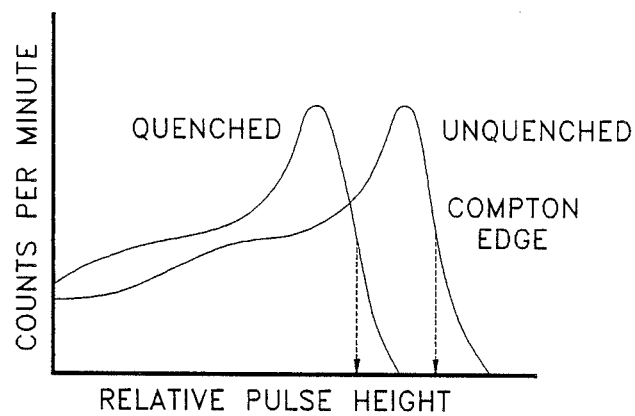
FIG. 1 shows a Cesium-137 generated Compton spectrum of quenched and unquenched samples, and the H# indication.

In FIG. 2, the problem is illustrated in that the chemical quench curve and color quench curve are different for different degrees of quench. The color quench curve shows lower efficiency relative to the chemical quench curve over the upper range of quench. The chemical-color relationship in FIG. 2 is general for any quench monitor, but is indicated here by H# which is obtained from data as indicated in FIG. 1 and disclosed in Horrocks (U.S. Pat. No. 4,075,480).

Color Monitoring

The level of quench in a given liquid scintillation sample is measured via a Compton spectrum generated by a gamma emitting radionuclide external to the sample. One example is the calculation of the H# which uses Cesium-137 as the external standard. A Compton spectrum is illustrated in FIG. 1, which also provides an explanation of H#. The Y axis in FIG. 1 is the number of events or counts detected by the liquid scintillation counter per minute in each channel, as indicated by the X-axis, of the multichannel analyzer. The sum of all such events is the total CPM of the sample.

Any liquid scintillation measurement can be described by a general or overall efficiency, $E_i$. This efficiency has several components, e.g. the efficiency of the cocktail, the fraction of photons leaving the sample vial, the type of quench present, the optical efficiency of the sample counting chamber, the quantum efficiency of the photomultiplier tubes and the efficiency of the electronics.

With an overall efficiency of conversion of 100%, the beta particles with $T_i$ kinetic energy would produce $N_i$ detected photons $$N_i = kT_i$$

where the proportionality factor, k, expresses both the 100% efficiency of conversion and the conversion of units from KEV to number of photons. In an actual measurement of the number of photons, $n_i$, produced by a beta particle with energy $T_i$, $n_i$ is less than $N_i$ or $$n_i = eN_i = ekT_i = cT_i$$

where e is the efficiency of photon conversion.

For a given LS counter and a given unquenched sample, a reference sample, Nr photons is produced by beta particles with kinetic energy $T_i$. If any quenching agent is added to that sample, then the number of observed photons, Nq, measures the extent of the quench relative to Nr. Nq and Nr measure the light intensity produced by beta particles with $T_i$ kinetic energy in the respective environments symbolized by "q" and "r".

The Beer-Lambert law provides a functional relation for such intensities, $$\ln\frac{(Nr)}{(Nq)} = \ln\frac{(Io)}{(I)}$$

where Io and I are the reference and experimentally measured intensities in the Beer-Lambert sense. Consequently, this permits $$\ln(Nr/Nq) = ELC$$

where L is the path length of the photons through an absorber with concentration C and inherent photon absorptivity of E.

In the LS operation the species with the concentration C is the quenching agent so that when C=0, then (Nr/Nq)=1 or Nq=Nr. A quench monitor is a monitor of the quenching agent. A general quench monitor, Q, (or the specific one, H#) is proportional to the concentration, C, of the quenching agent or $$Q = bC$$

so that $$\ln(Nr/Nq) = ELQ/b = dLH$$

where d=E/b and H is the H#. A detailed study of the Compton spectrum has shown that a variety of beta particle energies can be used to monitor highly colored samples.

As one example, consider the maximum energy of the spectrum defined as that energy corresponding to 0.995 of the total observed count rate, CPM or counts. Let Emu and Emq represent the maximum energy for unquenched and quenched samples respectively. For simplification, let ln(Emu/Emq)=A so that the above equation becomes $$A = dLH$$

Consider an unquenched sample in terms of this latter equation This is a reference solution. Consequently, the H# will be 0 so that A (or absorbance)=0 and (Nr/Nq)=1. The absence of absorbance means that no photons are lost.

Consider a chemically quenched sample. In such a sample, photons are not absorbed, i.e. they are not first produced and then absorbed by some molecule. Rather they are not produced at all. The latter equation applies to a reference sample whether or not the photons are absorbed or never produced since the end result of either process is the same; namely no detected photon. Therefore, dL may be combined into a single constant, d' because in a given sample the only parameter determining whether or not the photon is produced is the amount of quench, i.e. the concentration of the quenching agent, and the value of the H#. According $$A = d'H$$

Consider a sample in the presence of a color quench. The Beer-Lambert law applies in the conventional sense. Photons are produced and then absorbed in proportion to the concentration of the chromophore and the path length of the light. For a given sample the concentration of quenching agent is fixed, but there are a variety of pathlengths for photons generated by beta particles of the same kinetic energy. This is the "color problem" in liquid scintillation counting. However, light generated at random locations and travelling in random directions from those location has an average pathlength. This is calculated as the integral over minimum and maximum pathlengths divided by the number of events of beta particles with the specified energy. Complicated paths are generated by the combined optics of the sample vial and sample counting chamber.

Regardless, the system, in effect performs all the applicable mathematics and reports the result as the number of photons detected per average path length.

An experimental plot of A vs H# for both chemical and colored systems is given in FIG. 3. The data includes a wide range of quench, sample volumes, cocktails and chemical and color quenching agents. To obtain a pure Compton spectrum all radioactivity of the sample itself is subtracted The plot contains results of Compton spectra of samples with and without radionuclides being present. The presence of small scatter in the data makes it clear that sample radioactivity is correctly removed. Therefore, an H# measurement, or quench monitor Q in general, of such Compton spectra is independent of the isotope present in the sample.

The color quench curve is superimposed on the chemical quench curve up to a point and then departs. This mirrors the quench curve information shown in FIG. 2. The point of departure for chemical and color quench curves is noted by Qd in general or in the H# case as Hd. This means that the application of the Beer-Lambert law, as discussed, to chemical and color quench is appropriate up to the point of its nonlinearity.

Samples containing both color and chemical quenching agents fall between the two curves shown in FIG. 3 regardless of the wavelength of absorption of the chromophore or the relative percentage of which type of quench is present.

EXAMPLE

Following Ediss, Flanagan, McQuarrie and Wiebe Int. J. Appl. Radio Isot. 33, 296 (1988), a photon absorbing quenching solution with special properties was prepared. The solution consisted of four chemical components with specific concentrations that provide almost total absorbance over the range of about 380–560 nm. Ediss had noted that only 1.64 micromol of the color absorber molecules were required to produce 40% C-14 counting efficiency whereas 2770 micromol of nitromethane were needed to produce this level of chemical quench. It was therefore unlikely that the color quenching system produces much chemical quench.

No system of color quench and chemical quench has been found to fall outside the curves of FIG. 3. Consequently, FIG. 3 represents the universe of chemical quench and color quench. Mixtures of chemical quench and color quench have been found to fall in between these two curves regardless of cocktail, nature of the chemical or color quench agents or the wavelength of absorption of the chromophore. FIG. 3 is one basis for detecting which systems have an intensity of color sufficient to require color correction i.e. where the Beer-Lambert plot becomes non-linear after the point of departure Hd.

An exemplary color monitor algorithm proceeds in the following way. Measure an unknown sample's level of quench, Qs, e.g. Hs if H# is used. Compare Qs with Qd. If Qs is equal to or less than Qd, then a correct value for the DPM's of an unknown are obtained from the chemical quench curve. If Qs is greater than Qd, then measure A for the sample (let it be As) and compare it with A computed from the equation A=d'H (let it be Ac). If (Ac−As) is greater than a predetermined value, where the value is a function of the standard deviation of the plot in FIG. 3, then color correction is required If (Ac−As) is equal to or less than the predetermined value, the sample does not require color correction This does not mean the sample is not colored. It means however that the chemical and color quench curves are coextensive for this sample and the chemical quench curve data can be used in the further evaluation. This color monitoring is independent of the number and type of radionuclides present in the sample since the analysis depends upon a sample corrected Compton spectrum.

Color Correction

FIG. 3 is the basis for color monitoring. FIG. 3 coupled with the information expressed by FIG. 2 provides color correction. FIG. 2 contains experimentally determined chemical and color quench curves for carbon-14 in terms of H# over a wide efficiency range. The absolute difference between the two quench curves increases to a maximum and then decreases as quench continues to increase to very high H#'s. At counting efficiencies less than 3–4% for C-14, the experimental errors are comparable to the absolute value of the counting efficiency. Accordingly within this constraint, there is no difference between chemical and color quench curves. The concepts expressed by FIG. 2 are similar for several radionuclides including, for instance, tritium, H-3

Mathematically, quench curves may be expressed in different ways. As one of many examples, both chemical and color curves for carbon-14 can be expressed as ln(E) vs a cubic polynomial in the quench monitor, in general Q or specifically as H#.

The following definitions apply:
a. Ec represents the efficiency for the chemical quench curve. b. Ef represents the efficiency for the color quench curve.
c. Ecf represents the difference between chemical and color quench curves for the same nuclide. (Ec, Ef and Ecf are shown graphically in FIG. 2.)
d. Ac is the "effective absorbance" of chemical quenching agents.
e. Af is the "effective absorbance" of color quenching agents.
f. Acf is the difference between Ac and Af. (Ac, Af and Acf are shown graphically in FIG. 3.)
g. Acs is the absorbance difference between pure chemical quench, Ac, and the sample quench, As, at the same Q (or H#).
h. Ff is the fraction of the total quench dependent upon color and =Acs/Acf
i. C and D are the CPM and DPM of the unknown sample.

The following equations apply for the parameters defined above.

$$\ln(Ec) = \sum_{c=0}^{3} CcH^c \qquad \text{a.}$$

$$\ln(Ef) = \sum_{f=0}^{3} CfH^f \qquad \text{b.}$$

$$Ecf = e^{\Sigma CcHc} - e^{\Sigma CfHf} \qquad \text{c.}$$

$$Ac = d'H \qquad \text{d.}$$

$$Af = \sum_{f=0}^{3} FfH^f \qquad \text{e.}$$

$$Acf = \sum_{Cf=0}^{3} CcfH^{cf} \qquad \text{f.}$$

$$D = 100C/Ec \text{ if chemical quench only is present.} \qquad \text{g.}$$

-continued
$$D = 100C/(Ec - Ff(E_{cf}))$$ if color correction is required. h.

The assumptions underlying the algorithm below have been experimentally confirmed and are:
 a. The slope of Ac vs Q (or H#) is independent of instrument, volume container and cocktail.
 b. Acf is close to the maximum, color effect possible for a standard liquid scintillation "Maxi" vial. It is independent of the instrument, cocktail and chemical quenching. Acs/Af measures the relative contribution of color.
 c. Any unknown sample successfully monitored and corrected by the following algorithm must be homogeneous. Several dyes have presented problems because of decomposition and/or exchange reactions such that the radionuclide being counted presented 2 (Pi) geometry rather than 4 (Pi).

Exemplary Algorithm

1. Determine Emu from an unquenched reference sample so that $$Ac = ln(Emu/Emi) = d'H$$

(Emu may be any one of numerous points from the Compton spectrum of the reference standard.)
2. In range between selected Q on H values, determine the Qs (or Hs) of the unknown sample.
   If Qs = < Qd, use Ec to compute DPM.
   If Qs > Qd, is color correction required?
3. Measure As for the sample. Compute Ac from d'H.
4. Compute Ac − As
   If Ac − As = > a predetermined value then color correction is required.
   If Ac − As < the predetermined value, then chemical correction is required.
5. D = 100C/Ec if chemical quench is required
   Ec is obtained from a previously prepared chemical quench curve for the nuclide of interest. 6. If color correction is required, then $$Ff = Acs/Acf = (Ac - As)/Acf \text{ and } D = \frac{100C}{(Ec - Ef(Ecf))}$$

Only Ec is needed from a previously prepared quench curve.

The values of Qd and the predetermined value are chosen to match the desired error to be tolerated, e.g. one might use the predetermined value as 2 times the standard deviation of the data used to determine the linear fit for Ac.

The Liquid Scintillation Counter With Color Monitor and Color Correction

FIG. 5 is a block diagram of a liquid scintillation counter. The LS counter provides a Compton spectrum of a presented sample, and a monitor for the sample to determine whether any color absorbance is sufficient to require color correction. Additionally the LS counter makes the correction in terms of a previously prepared chemical quench curve in order to obtain the correct value of activity (DPM) of the sample.

Block 1 is a high voltage control for photomultiplier tubes 2A and 2B located at opposite sides of the sample counting chamber 3. The two photomultiplier tubes 2A and 2B detect photons in coincidence. There are photons generated by the same beta event but moving in opposite directions and detected by one of the photomultiplier tubes 2A or 2B within X nanoseconds of detection by the first photomultiplier tube 2A or 2B. The tube outputs are directed to a coincidence gate 7 which electronically passes the signal through an analog-to-digital converter 8 to a multichannel analyzer 9, should the pulses be in coincidence. Should the two pulses be determined to be out of coincidence, then the coincidence gate 7 is closed so that the multichannel analyzer 9 does not receive the pulse.

The outputs from the photomultiplier tubes 2A and 2B are also directed to a summation amplifier 5 which adds the two pulses and thereby increases the sensitivity of detection. The signal would otherwise be halved on average as if only one tube were present. The summed signal is amplified further by amplifier 6 and then is passed or not passed by the coincidence gate 7 as previously described.

The analog signal from the coincidence gate 7 passes to the analog-to-digital converter 8 before being fed to the multichannel analyzer (MCA) 9. The MCA 9 determines the relative intensity of the pulse and sorts a count in the appropriate channel. A computer 10 analyzes the spectral results contained in the MCA 9 and outputs the information. The computer 10 also controls other circuitry, motors, all interaction with the user and provides all needed calculations. The computer 10 provides an output 111. The summation amplifier 5 operates a timer 112 which interacts with the computer 10. A log converter circuit 113 is connected between the coincidence gate 7 and the converter 8.

One computer control is to activate the source drive on demand. The source drive 114 moves the Cs-137 source 115 adjacent the sample so that gamma irradiation may take place to produce the Compton spectrum discussed previously with regard to FIG. 1. Since light pulses detected during gamma irradiation will contain Compton counts, Cc, as well as sample counts, Cs, the total counts are (Cc + Cs). It is therefore necessary to count the sample after the Cs137 has been removed to obtain Cs for subsequent subtraction from (Cc + Cs).

The computer combined with memory provides the means to locate any preselected point on the pure Compton spectrum, such as the energy corresponding to 0.995 of the total counts or the H#. Furthermore, the appropriate computations and logical comparisons outlined by the above illustrated algorithm are readily accomplished by the appropriate software code. These include but are not limited to: H#, Emu, Ems, Ac, As, (Ac—As), Ff, Ec, Ef, Ecf, Ff, and D.

In actual example experiments the coded algorithm defined above was used for C-14 tagged systems containing samples with pure chemical quench, pure color quench and combined chemical/color quench with counting efficiencies extending over the approximate range of 96% -25 %. Tables 1 and 2 illustrate the minimum, maximum and average errors obtained for DPM recovery and for counting efficiency of the standards used.

TABLE 1

| % Error Recovery in DPM for C-14 Tagged Samples |||||||||
|---|---|---|---|---|---|---|---|---|
| Chem. Standards ||| Color Standards ||| Unknowns: Chem/Col |||
| min err. | max err. | mean err. | min err. | max err. | mean err. | min err. | max err. | mean err. |
| 0.3 | 1.9 | 1.0 | 0.4 | 4.5 | 1.8 | 0.1 | 2.1 | 1.2 |

TABLE 2

| % Error in Counting Efficiency of Pure Chemical and Colored Standards For C-14 | | | |
|---|---|---|---|
| Chem. Standards % Error in Ec | | Color Standards % Error in Ef | |
| min | max | min | max |
| 0.3 | 1.5 | 0.1 | 1.1 |

Table 3 summarized the % error in DPM recovery for colored samples if no color correction is applied.

TABLE 3

| % Error in DPM Recovery for colored Samples Without Color Correction For C-14 | |
|---|---|
| H# | % Error in DPM Recovery |
| 250 | 9.9 |
| 300 | 14.9 |
| 350 | 23.0 |
| 400 | 29.4 |

The color monitor accordingly distinguishes between the presence of chemical quench and color quench in the quench domain where the color quench counting efficiency differs from the chemical quench counting efficiency for the same value of the quench monitor determined from Compton Spectra collected in the coincidence mode. The color monitor is independent of the number of radionuclides present in a sample.

The system also provides for correcting the counting efficiency of pure colored samples and samples containing both chemical and color quenching agents where the color monitor indicates such a correction is necessary.

The liquid scintillation counter incorporating the color monitor and color corrector is automated. The counter is provided with a chemical quench curve for the isotope of interest. Accordingly, DPM results are obtained for sets of samples that contain chemical quenching agents, color quenching agents and mixtures of chemical and color quenching agents without operator intervention.

The relationship of Absorbance to counting efficiency and quench monitor as illustrated in FIG. 3 and 4 provides an important advance in color monitoring, correction, and LS counting. Deviation from the straight line relationship of chemical quenching - Ac in FIG. 3 is easily determined. In this manner, appropriate determinations of the existence of color are made. Also the range of the quench over which color can be determined and corrected is extensive. For instance, this is greater than an H# of 200, and as great as 500. Accordingly effective data can be obtained with samples having high color quench. The scope of the LS instrumentation is accordingly increased in an important respect. The difference Acf is independent of the instrument, cocktail and sample containers. Hence for each nuclide, a single chemical quench curve is presented which then can provide for results independent of instrument, cocktail and sample.

Exemplary embodiments have been described and illustrated. It will be understood that many variations are possible, each differing from the other in matters of detail only. The scope of the invention is to be determined solely by the following claims.

I claim:

1. A method for determining the existence of color in a sample in a liquid scintillation counter comprising the steps of determining at a predetermined external standard of quench level a system efficiency characteristic of the sample, determining at the predetermined quench level a system efficiency whether there is the existence of a predetermined degree of deviation of the respective system efficiency characteristic, such deviation being indicative of color.

2. A method as claimed in claim 1 wherein the system efficiency standard is an absorbance characteristic and wherein the absorbance characteristic due to chemical quench is essentially a linear relationship relative to quench level.

3. A method as claimed in claim 1 wherein the deviation is expressed as a cubic polynomial.

4. A method as claimed in claim 1 wherein the external standard of quench level is expressed as an H number.

5. A method as claimed in claim 4 wherein the deviation is determined for an H number greater than about 200.

6. A method as claimed in claim 4 wherein the H number extends into a range up to about 500.

7. A method as claimed in claim 4 wherein the range of the H number is between about 200 and 500.

8. A method for determining the existence of color in a sample in a liquid scintillation counter comprising the steps of determining at a predetermined counting efficiency an absorbance characteristic of the sample, determining an absorbance characteristic due to chemical quench at the predetermined counting efficiency, and determining whether there is the existence of a predetermined degree of deviation between the respective absorbance characteristics, such deviation being indicative of color.

9. A method for determining the existence of color in a sample in a liquid scintillation counter comprising the steps of determining an absorbance characteristic in respect of a selected nuclide for different quench values due to chemical quench, determining the absorbance characteristic of the sample, and determining whether there exists a deviation in the respective absorbance characteristics of a predetermined magnitude, such deviation being an indication of the existence of color in the sample.

10. A method as claimed in any one of the claims 1 to 9 wherein the determination of the existence of a color in the sample is indicative of color quench and including the step of distinguishing the sample from a chemically quenched sample.

11. Apparatus for determining the existence of color in a sample in a liquid scintillation counter comprising means for establishing the absorbance characteristic due to chemical quench at predetermined quench levels, and means for determining at a predetermined quench level whether there is a deviation of absorbance characteristic by the sample from the absorbance characteristic due to chemical quench, said deviation being indicative of color.

12. Apparatus for liquid scintillation counting of a sample comprising means for determining the counts of the sample according to the presence of a chemical quench, and means for determining the counts of the sample such that the existence of a color component in the sample is determined by a predetermined variation of the counts of the sample from the counter due to chemical quench.

13. Apparatus as claimed in claim 12 including means for correcting the counts of the sample according to the degree of color in the sample.

14. Apparatus as claimed in claim 13 including means for determining the counts according to a degree of chemical quench and determining the existence of color according to a departure of the counts from the chemical quench data.

15. Apparatus as claimed in claim 12 including means for determining the counting efficiency for a chemical quenched sample and determining the counting efficiency for the presence of a color quench, the difference in counting efficiency indicating the existence and the amount of color present in the sample.

16. Apparatus as claimed in claim 12 including means for correcting the counting efficiency in accordance with the degree of color present in the sample.

17. Apparatus as claimed in claim 12 including means for obtaining absorption data according to chemical quench and means for obtaining absorption data according to color quench, a difference between the data indicating the presence of color.

18. Apparatus as claimed in claim 17 wherein the chemical absorption data is a linear relationship over a substantial quench range and the color quench absorption data is a polynomial relationship over a substantial quench range, and means for determining the difference between the polynomial and linear relationship as a measure of color.

19. Apparatus as claimed in claim 18 including means for correcting the absorption data according to the difference between the two data ranges.

20. Apparatus as claimed in claim 12 wherein the means for determining the count of a liquid scintillation counter effects counting automatically.

21. A method for liquid scintillation counting of a sample including establishing a counting efficiency to chemical quench relationship for a counter, computing a counting efficiency to sample quench relationship, relating the counting efficiency for the chemical quench according to concentration, relating the counting efficiency for the sample quench according to concentration, distinguishing the two concentrations for a predetermined degree of quench, and reducing the chemical quench counting efficiency according to the concentration distinctions to a value to compensate for the degree of color present in the sample thereby to obtain a corrected counting efficiency.

22. A method as claimed in claim 21 wherein the counts per minute is obtained and relating the counts per minute to the counting efficiency to obtain the disintegrations per minute.

23. A method as claimed in claim 22 wherein the determination of counting in the LS counter is independent of the volume of the sample and the degree of color in the sample.

24. A method as claimed in claim 23 wherein the measurement for color is independent of a quench range.

25. A method as claimed in claim 24 wherein measurement for determining the existence of color is in a range as low as 20% counting efficiency.

26. A method as claimed in claim 25 wherein the counting efficiency is as low as about 5%.

27. A method as claimed in claim 26 wherein the method of determination for an isotope C-14 is obtained for counting efficiencies below about 90%.

28. A method as claimed in claim 21 wherein the sample contains multiple isotopes.

29. A method for determining the existence of color in a sample in a liquid scintillation counter comprising the steps of determining at a predetermined quench level by an external standard:
   a system efficiency characteristic of the sample,
   a system efficiency characteristic of chemical quench,
   and a degree of deviation from the system efficiency characteristic, such deviation being predetermined to be indicative of color.

* * * * *